3,756,782
METHOD AND APPARATUS FOR DETERMINING CARBON DIOXIDE CONTENT OF BLOOD SAMPLES

Roger Phillips, Palo Alto, Calif., assignor to American Hospital Supply Corporation, Evanston, Ill.
Filed Feb. 22, 1972, Ser. No. 228,073
Int. Cl. G01n 31/00, 33/16
U.S. Cl. 23—230 B      15 Claims

ABSTRACT OF THE DISCLOSURE

A method and apparatus for determining the carbon dioxide content of blood samples in which a syringe is connected in gas-tight relation to a vial containing a blood sample. The sample, when acidified, releases carbon dioxide and a quantitative measurement is then obtained by measuring the displacement of the syringe plunger. Specific features of the apparatus include the clamping means for securing a gas-tight seal between the syringe and vial.

BACKGROUND

The acid-base balance in blood is an important diagnostic parameter involving respiration ($CO_2$) and renal function ($HCO_3^-$). The chemical equilibrium in question is as follows:

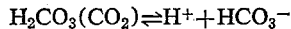

$$H_2CO_3(CO_2) \rightleftharpoons H^+ + HCO_3^-$$

In order to fully analyze this equilibrium it is necessary to make two measurements. One approach has been to measure $CO_2$ content (i.e., $H_2CO_3(CO_2) + HCO_3^-$) and pH. Another has been to measure pH and $pCO_2$. This invention is concerned with an apparatus and method for analyzing the aforementioned acid-base equilibrium under the first approach.

In accordance with the Van Slyke procedure, carbon dioxide will be liberated from a sample which has been acidified as follows:

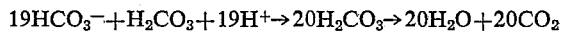

$$19HCO_3^- + H_2CO_3 + 19H^+ \rightarrow 20H_2CO_3 \rightarrow 20H_2O + 20CO_2$$

This equation represents the approximate distribution of carbon dioxide between bicarbonate and dissolved carbon dioxide, that is, 95 percent of the carbon dioxide is in the blood as bicarbonate. See also R. J. Henry, Clinical Chemistry, 435 (Hoeber, N.Y. 1964).

While equipment and methods have been developed in the past to utilize the chemistry of the Van Slyke procedure in determining the carbon dioxide content of blood, such equipment has been relatively complex in structure and operation. Thus, patent 2,946,665 discloses a method for measuring the differential fluid pressures of a blood sample before and after carbon dioxide is removed therefrom. Such a measurement requires differential pressure conduits as well as electronic recording equipment, resulting in a relatively complex and expensive system.

SUMMARY

An important aspect of the present invention lies in providing a method and apparatus for measuring the carbon dioxide content of blood which overcome the aforementioned defects and disadvantages of prior systems. Specifically, it is a main object of the invention to provide an apparatus which is relatively simple and inexpensive in structure and operation and which is highly effective in yielding a quick determination of the carbon dioxide content of blood.

It has been discovered that the carbon dioxide content of a blood sample may be effectively and readily determined by utilizing a gas-tight syringe having a chamber and a plunger therein, the chamber of the syringe being in direct communication with a vial in which the blood sample and a measured quantity of acid have been mixed. As carbon dioxide is liberated from the acidified blood sample, the plunger of the syringe is displaced and the extent of such displacement, as indicated by the markings on the graduated syringe, reveals the amount of carbon dioxide so liberated.

In one embodiment of the invention, the acid and its sample are intermixed by injecting the acid into the sample from the same syringe which is subsequently used in measuring the amount of carbon dioxide evolved. In performing the method of the invention, it is essential that a gas-tight connection be maintained between the mixing container (vial) and the variable volume chamber (syringe chamber).

DRAWINGS

DESCRIPTION

Figure 1:
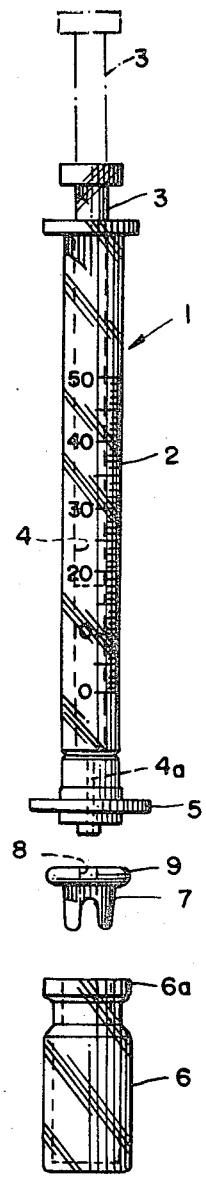
FIG. 1 is an exploded elevational view of an apparatus embodying the present invention.

FIG. 1 illustrates an apparatus in unassembled form comprising a syringe 1 having a barrel 2 and a plunger 3 slidably received therein. The barrel and plunger together define a variable volume chamber 4 which decreases or increases in size as the plunger is depressed and extended. The lower or delivery end of the barrel is equipped with an opening 4a communicating with the variable volume chamber and, in effect, forming a part thereof. A flange 5 extends perimetrically about the delivery end of the barrel, the flange preferably being of annular shape.

Figure 2:
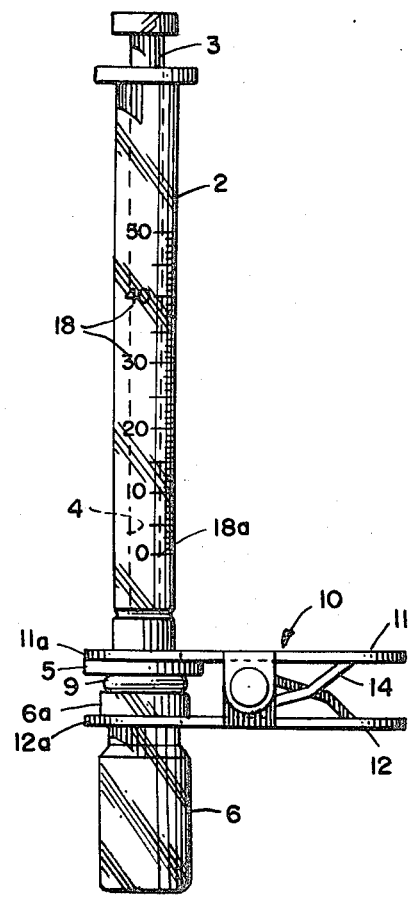
FIG. 2 is an elevational view similar to FIG. 1 but showing the apparatus in assembled condition.

The numeral 6 generally designates a sample container or vial which is open-topped and which is provided with an annular flange 6a adjacent the open upper end. A resilient coupling member in the form of a stopper 7 is adapted to be interposed between the delivery end of the syringe and the vial. As shown in FIG. 1, the stopper has an axial passage 8 extending therethrough and an annular resilient flange 9 of larger diameter than the opening of vial 6. Thus, when the parts are assembled as illustrated in FIG. 2, flange 9 of the stopper not only provides a resilient cushion between the vial and syringe but also contributes in forming an effective gas-tight seal between the enlarged upper end 6a of the vial and the annular flange 5 of the syringe.

Figure 3:
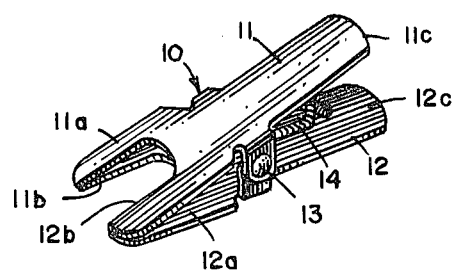
FIG. 3 is a perspective view of a clamp for maintaining the syringe and vial in gas-tight communication.

In one embodiment of the invention, the means for securing the syringe and vial in gas-tight relation comprises a clamp 10 (FIG. 3). The clamp comprises a pair of members 11 and 12 pivotally connected intermediate their ends by pin 13. Each member is provided with a jaw 11a and 12a having a recess 11b and 12b for receiving the reduced portions of barrel 2 (above flange 5) and vial 6 (below flange 6a), respectively. A spring 14 urges the handle portions 11c and 12c apart, thereby exerting a closing force on jaws 11a and 11b. When the parts are in the condition illustrated in FIG. 2, spring 14 is a state of tension, jaw 11b bearing downwardly on barrel flange 5 and jaw 12b bearing upwardly against vial flange 6a to urge the parts together and compress the resilient sealing flange 9 therebetween. When the parts are so assembled, the interior of the vial or sample container 6 communicates directly with the variable volume chamber 4 of barrel 2 while at the same time the parts are coupled so that a gastight seal is formed therebetween.

Figure 4:
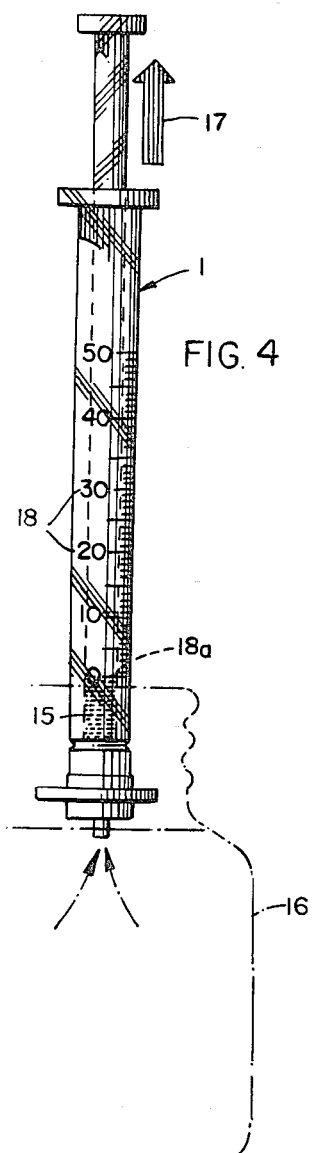
FIG. 4 is an elevational view illustrating an initial step in the method of the invention.
Figure 5:
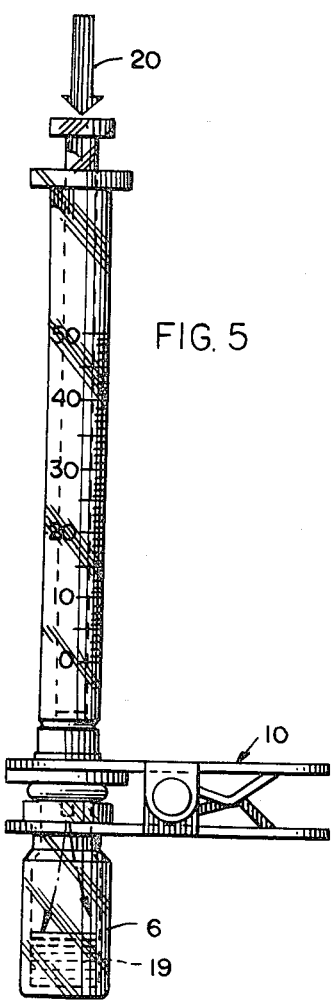
FIG. 5 is an elevational view illustrating a subsequent step in which a measured quantity of acid is discharged into a sample-containing vial.
Figure 6:
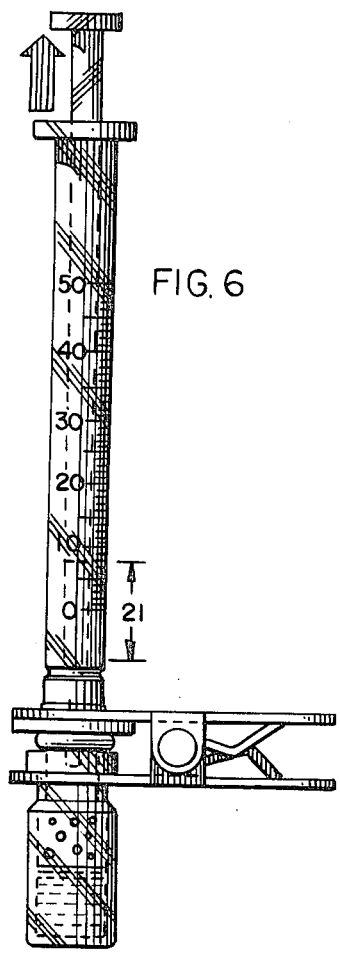
FIG. 6 is an elevational view illustrating a still further step of the method in which the variable volume chamber of the syringe is expanded under the influence of carbon dioxide liberated from the acidified sample.

FIGS. 4, 5 and 6 illustrates the sequence of steps in practicing the method of the invention. In FIG. 4, a quantity of acid 15 is drawn from any suitable container 16 into the open end or nozzle of the barrel by manually withdrawing plunger 3 in the direction of arrow 17. Lactic acid has been found particularly effective but any suitable organic or mineral acid may be used. The amount of acid drawn into the syringe is not critical as long as a quantity sufficient to liberate all of the carbon dioxide in a selected volume of blood is used.

It will be observed that the barrel of the syringe is provided with graduation marks and numerals 18. The zero mark 18a is conveniently positioned so that when the lower end of plunger 3 is withdrawn to a point where it is even with such mark, the volume of acid drawn into the syringe will be sufficient to fully acidify the selected volume of blood 19 within vial 6. Thus, where the procedure calls for a sample volume of 1.0 milliliter in vial 6, it has been found that the syringe will be effectively calibrated if the zero marking 18a is located so that approximately 0.1 milliliter of lactic acid (22 percent) will be drawn into the syringe when the end of the plunger is at that level. When the acid is then discharged into the blood sample, and mixed with that sample (FIG. 5), the final pH of the solution will be approximately three.

The step of FIG. 5, in which the acid is discharged into the sample-containing vial, is undertaken only after the syringe and vial have been securely clamped together by the forked clamp 10. Depression of the plunger in the direction of arrow 20 expels all of the acid into the vial. The operator then grips the entire apparatus by means of the handle portions of clamp 10 and agitates the fluid within the vial to insure intimate mixing of the acid and sample. Clamp 10 thereby serves an important function in providing a gripping means for supporting the apparatus during the mixing step. It is to be understood, however, that the contents of the vial may be mechanically mixed by resting the vial upon the vibrating platform of a standard mixer; however, even in such a case, the handle portions of clamp 10 are used by the technician to hold the syringe in the upstanding or generally vertical position illustrated in FIG. 6.

Upon acidification and agitation, the sample 19 releases carbon dioxide which expands into the syringe barrel and displaces plunger 3 as represented in FIG. 6. The extent of such displacement is indicated by numeral 21 in FIG. 6 and is measured by the technician by simply reading the position of the lower end of the plunger along linear scale 18. Such scale is calibrated in millimoles of carbon dioxide per liter of solution.

An accurate measurement of carbon dioxide content regardless of atmospheric pressure may be obtained by employing a standard solution of known carbon dioxide content, the carbon dioxide content of the standard being capable of liberation by acidification in the manner already described. The true carbon dioxide content of the blood sample is thus represented by the following equation:

period of a few hours or less, the carbon dioxide content of only one such standard need be determined. The purpose of the standard is to compensate for changes from day to day, or over even longer intervals, because of fluctuations in atmospheric conditions.

Throughout the above description, reference has been made to a "blood" sample, the purpose of the test being to determine the carbon dioxide content of such a sample. It is to be understood, however, that the blood sample may be either whole blood, serum, or plasma. The use of serum or plasma is generally preferred because of problems in cleaning the apparatus when whole blood is used; however, if difficulties in cleaning the equipment are not considered objectionable, then whole blood may effectively be used.

Figure 7:
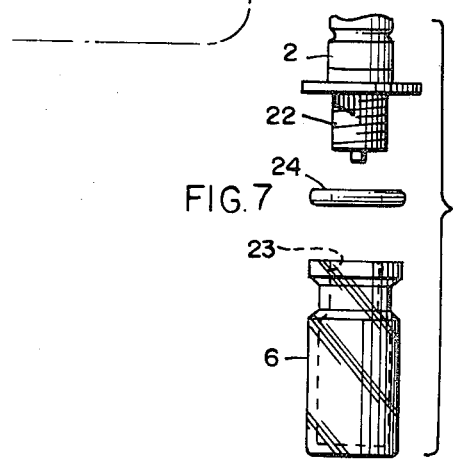
FIG. 7 is a fragmentary and exploded elevational view illustrating alternative means for sealingly coupling the sample container and syringe.
Figure 8:
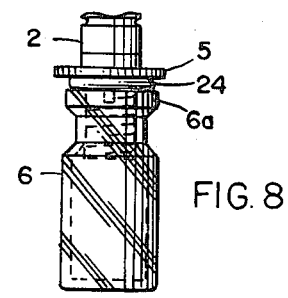
FIG. 8 is a fragmentary elevational view showing the parts of FIG. 7 in assembled condition.

FIGS. 7 and 8 illustrate a variation of the equipment already described. The structure shown therein is the same as that illustrated in FIGS. 1 through 6 except that clamp 10 is eliminated and a threaded connection is provided between the syringe and vial. Specifically, the lower end of the syringe barrel 2 is provided with external threads 22 beneath flange 5. Such threads engage the internal threads 23 in the neck of vial 6. Most desirably, a resilient annular sealing element 24 (which may be adhesively secured, or attached by any other suitable means, to either the syringe or the vial) is interposed between flange 5 of the syringe barrel and flange 6a of the vial when the parts are assembled as illustrated in FIG. 8. The result is a fluid tight connection between the syringe and the vial.

While in the foregoing I have disclosed an embodiment of the invention in considerable detail for purposes of illustration it will be understood by those skilled in the art that many of these details may be varied without departing from the spirit and scope of the invention.

I claim:

1. A method for determining the carbon dioxide content of a blood sample utilizing a gas-tight plunger-equipped syringe having a variable volume chamber therein, comprising the steps of intermixing said sample with a quantity of acid sufficient to liberate the carbon dioxide content of said sample in a vial while the variable volume chamber of said syringe is maintained in fluid-tight connection with said vial, and thereafter determining the carbon dioxide content of said sample by measuring the displacement of said plunger under the influence of carbon dioxide liberated by the acidified sample.

2. The method of claim 1 wherein said acid is intermixed with said sample by injecting said acid from said syringe into the sample-containing vial.

3. The method of claim 1 wherein said acid is lactic acid.

4. The method of claim 1 wherein there is the further step of agitating the acid and sample immediately following intermixing thereof to promote the liberation of carbon dioxide.

5. A method of determining the carbon dioxide content of a blood sample utilizing a gas-tight syringe having a graduated chamber and a plunger therein, comprising the steps of securing a vial with a gas-tight connection to said syringe so that the variable volume chamber of said syringe communicates directly with said vial, said vial containing a measured sample of blood and said syringe containing a measured quantity of acid, then discharging the contents of said syringe into said vial until all of said acid is disposed in the vial and said plunger is in its fully $$\text{True carbon dioxide content of blood sample} = \frac{\text{displacement caused by blood sample}}{\text{displacement caused by standard solution}} \times \text{carbon dioxide content of standard solution}$$

In a preferred form of this invention, the standard consists of a bicarbonate solution of known carbon dioxide content. It will be understood that in running a series of carbon dioxide content tests on blood samples over a inserted position, then agitating the acid and blood within said vial to thoroughly intermix the same, and then measuring the displacement of said plunger from its fully inserted position under the influence of carbon dioxide discharged from the vial into the variable volume chamber of the syringe to determine the carbon dioxide content of the blood sample.

6. The method of claim 5 in which there is the further step of determining the true carbon dioxide content of said sample by correcting for atmospheric pressure.

7. The method of claim 6 wherein the step of correcting for atmospheric pressure comprises subjecting a standard solution containing a known carbon dioxide content, said content being capable of liberation by acidification of said solution, to the steps of claim 5 and thereafter employing the results therefrom in the following equation:

$$\frac{\text{True carbon dioxide content}}{\text{of blood sample}} = \frac{\text{displacement caused by blood sample}}{\text{displacement caused by standard solution}} \times \frac{\text{carbon dioxide content}}{\text{of standard solution}}$$

8. The method of claim 5 wherein handle-equipped clamping means are utilized for attaching said syringe and vial in gas-tight relation, said syringe and vial being supported for agitation of said sample and acid by the handle of said clamping means.

9. An apparatus for measuring the carbon dioxide content in a blood sample, comprising a gas-tight syringe having a barrel and slidable plunger defining a variable-volume chamber, a vial adapted to contain a measured volume of blood, and threaded or clamp means releasably coupling said syringe and plunger in gas-tight relation with said variable-volume chamber in direct communication with the interior of said vial, said syringe barrel being transparent and having graduation markings therealong to indicate the extent of displacement of said plunger under the influence of carbon dioxide liberated from the sample within said vial when said sample is acidified.

10. The structure of claim 9 in which said means includes a spring clamp releasably engaging said barrel and said vial for urging the same tightly together.

11. The structure of claim 10 in which said means also includes a resilient sealing member interposed between said syringe barrel and said vial.

12. The structure of claim 10 in which said syringe barrel and said vial are each provided with flanges adjacent their connected ends, said spring clamp engaging said flanges to urge said vial and barrel together.

13. The structure of claim 9 in which said means comprises threaded portions of said barrel and vial, said portions being threaded together to provide a fluid tight connection between said vial and syringe barrel.

14. The structure of claim 13 in which a resilient sealing member is disposed between said vial and barrel.

15. The structure of claim 10 in which said clamp is provided with handle portions for manual operation of the clamp and for supporting said apparatus when said acid and sample are being intermixed.

References Cited
UNITED STATES PATENTS 2,680,060    6/1954    Natelson _____ 23—230 B X
3,443,904    5/1969    Hill _____ 23—254 R X MORRIS O. WOLK, Primary Examiner T. HAGAN, Assistant Examiner U.S. Cl. X.R.

23—232, 253 R, 258.5